July 2, 1935. J. C. CURTIS 2,006,444
FEEDING MECHANISM FOR ROCK DRILLS
Filed March 23, 1932
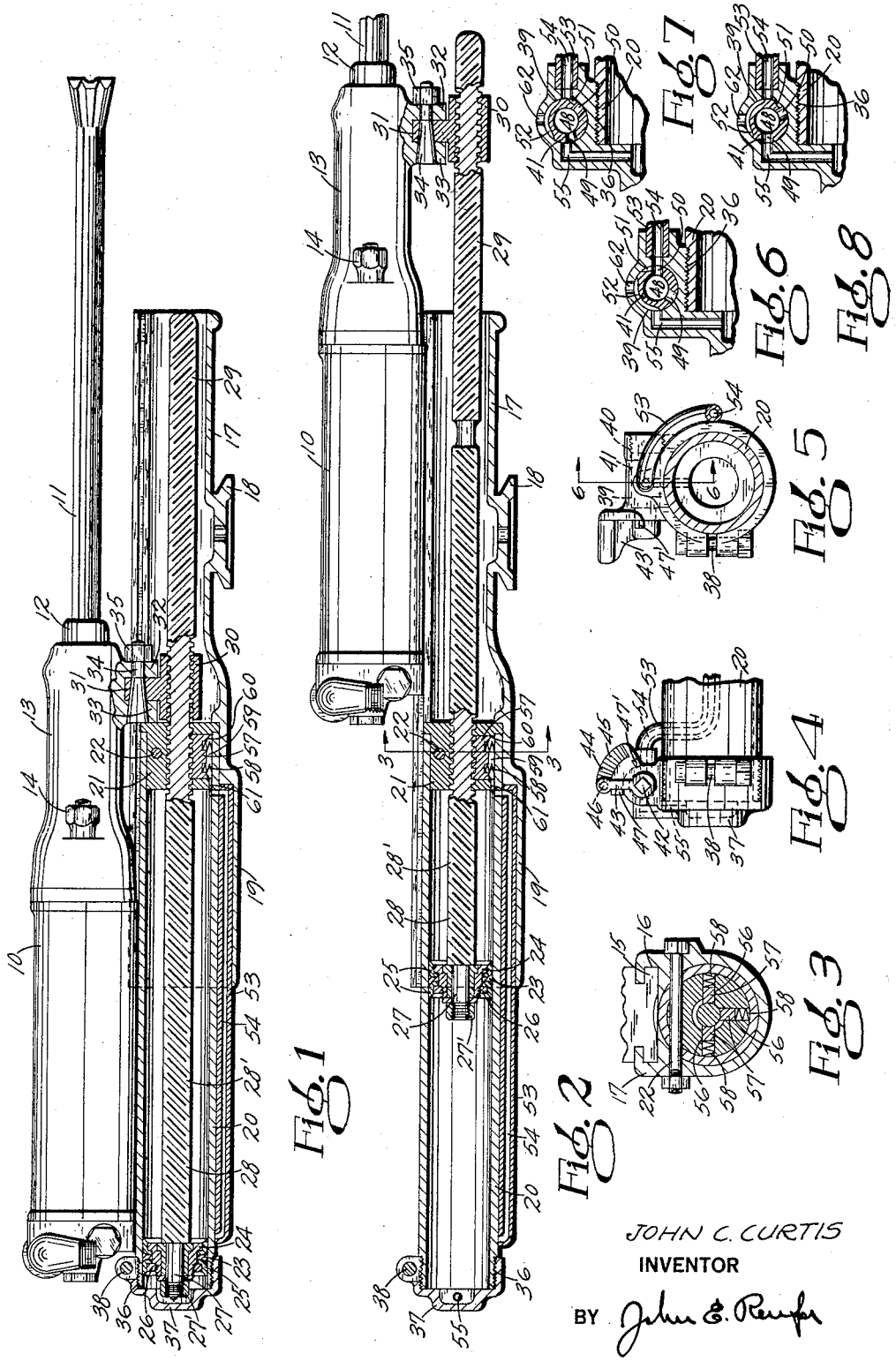
JOHN C. CURTIS
INVENTOR
BY
ATTORNEY Patented July 2, 1935

2,006,444

UNITED STATES PATENT OFFICE 2,006,444

FEEDING MECHANISM FOR ROCK DRILLS

John C. Curtis, Cleveland, Ohio, assignor to The Cleveland Rock Drill Company, Cleveland, Ohio, a corporation of Ohio Application March 23, 1932, Serial No. 600,634

17 Claims. (Cl. 121—9)

This invention relates broadly to rock drills, but it is more particularly concerned with feeding mechanism for rock drills of the drifter type.

One of the objects of this invention is to provide an improved and compact feeding mechanism for rock drills.

Another object of this invention is to provide a fluid actuated feeding mechanism for rock drills whereby a certain longitudinal displacement of the feed piston will result in a greater longitudinal displacement of the rock drill, thus reducing the overall length of the assembly and permitting relatively long feed.

Other objects and advantages reside in the specific construction and aggroupment of the elements peculiar to this structure as will become apparent from a more complete examination of this specification, wherein there are assembled and pointed out certain combinations of parts and specific construction indicative of the scope and spirit of the invention.

In the drawing which illustrates a preferred embodiment of the invention:

Fig. 1 is a longitudinal view partly in section, illustrating a drilling motor with the feeding piston positioned in one extreme end of its travel.

Fig. 2 is a view similar to Fig. 1, illustrating the drilling motor with the feeding piston positioned intermediately the extreme ends of its travel.

Fig. 3 is a cross sectional view taken in a plane indicated by line 3—3 in Fig. 2.

Fig. 4 is a longitudinal elevational view illustrating the end portion of the feed cylinder.

Fig. 5 is a rear end view of the portion of the feed cylinder illustrated in Fig. 4.

Fig. 6 is a cross sectional view taken in a plane indicated by line 6—6 in Fig. 5.

Figs. 7 and 8 are views similar to Fig. 6 illustrating the throttle valve in different positions.

Referring now to the drawing, the rock drill shown for the purpose of illustration comprises a cylinder 10 within which there is reciprocably mounted a piston capable of delivering its blows to a drill steel 11. The drill steel is conveniently mounted within a chuck 12 which is journaled within a front housing 13 secured to the cylinder 10 by a pair of side bolts 14.

The cylinder 10 is provided on its external wall with a pair of laterally disposed gibs 15 which are slidably mounted and guided in a pair of corresponding grooves or ways 16 provided in the shell 17. For mounting purposes upon a tripod or other supporting device, the shell 17 is formed intermediate its ends with a cone 18.

On one side of the cone 18, the wall of the shell 17, uniting the two ways 16, is enlarged to form a circular contour or supporting bearing 19, within which is mounted the forward portion of a relatively long tube or feed cylinder 20. Within the outer end of that portion, the tube is capable to snugly receive a screw threaded bushing 21. The bushing together with the tube 20 are integrally affixed within the shell 17 by a transversally disposed clamping bolt 22.

Slidably mounted within the feed cylinder 20, there is a piston 23 comprising a screw threaded sleeve 24 upon which there is mounted a plurality of packing 25 preferably made of fibrous material such as leather to afford a perfect joint with the wall of the feed cylinder. These packings are maintained upon the sleeve 24 by the engagement of a screw threaded nut 26. Within the piston 23, there is rotatably mounted the end 27 of a feed screw 28 secured therein against relative longitudinal displacement by the engagement of a screw threaded nut 27'. For a portion of its length, the screw 28 is provided with a left hand thread 28' capable of rotatable engagement within the screw threaded bushing 21, the remaining portion 29 of the feed screw 28 being provided with a right hand thread which is capable of rotatable engagement within a nut 30 formed with a bore of complemental configuration. The nut 30 is shaped with an upwardly projecting tongue 31 engaged between two depending lugs 32 and 33 integral with the front housing 13, this tongue is secured therein by a clamping bolt 34 associated with a nut 35.

Toward the left, the feed cylinder 20 has its external wall provided with a screw threaded portion 36 capable to receive in screw tight engagement therewith an enclosure or backhead 37 being secured thereon against relative rotation by a clamping bolt 38. Vertically disposed within the backhead 37, there is a cylindrical chamber 39, terminated in one direction by a screw threaded portion 40 within which may be secured the end of a motive conduit (not shown). Disposed in fluid tight engagement with the internal wall of the chamber 39, there is a rotatable throttle valve 41, formed with a square stem 42 projecting outwardly of its chamber and upon which is secured a handle 43. Adjacent the handle 43, the backhead 37 is formed with an outwardly projecting flange 44 upon which there is provided a plurality of closely spaced recesses 45. A spring pressed plunger 46 being slidably mounted within the handle 43 has its protruding end conveniently machined for engagement within the recesses 45, thus affording a locking device for any desired position of the throttle valve 41 when rotated from one end of its extreme travel or stop 47 to the other stop 47'. The throttle valve 41 is formed with a central bore 48 being in constant communication with the external wall of the valve through two radially disposed ports 49 and 50, the last port being associated with a recess 51, the purpose of which will be explained hereafter. Another recess 52 somewhat longer than the recess 51 is also formed on the external wall of the throttle valve as illustrated in the drawing.

Leading from the throttle valve chamber 39 to the rightward end of the feed cylinder 20, there is a relatively small tube 53 the interior thereof constituting a fluid passage 54, and leading from the same chamber 39 to the extreme leftward end of the feed cylinder 20, there is a port 55.

The nut 21 is provided with transversally disposed slots 56, within which there is slidably mounted plate like packings 57 preferably made of leather and having one of their ends threaded for engagement with the left hand threaded screw portion 28'. These packings are forced in engagement with the screw 28 by the tension of compression springs 58 disposed rearwardly thereof and seated upon the internal wall of the feed cylinder 20. The packings are of convenient height to allow a certain clearance or packing chamber 59 between the internal wall of the feed cylinder 20 and the rear wall of the packings, said rear wall being somewhat concave thus affording on the edge thereof a thin lip 60. The chamber 59 is in constant communication with the interior of the feed cylinder 20 through a restricted passage 61.

In the operation of the mechanism, assuming the parts to be positioned as illustrated in Fig. 1 and the throttle valve positioned as illustrated in Fig. 6, pressure fluid will be admitted into the air feed cylinder 20 from the valve bore 48, valve passage 50 and passage 54 thus maintaining the piston 23 into the extreme end of its travel, said travel being limited by the engagement of the front housing lug 33 with the nut 21. The pressure fluid within the air feed cylinder 20 will be prevented to leak past the piston 23 by the association of the packing 25. The pressure fluid will be admitted into the nut packing chambers 59 through the passage 61 thus creating pressure upon the packings 57 and together with the tension exerted by the compression springs 58, will forcibly maintain the packings 57 in tight fluid engagement with the screw 28, thus preventing the escape of pressure fluid from the air feed cylinder around the screw 28.

When it is desired to feed the rock drill slowly toward the right, the throttle valve 41 may be positioned as illustrated in Fig. 7. A small amount of pressure fluid is admitted into the rear end of the feed cylinder through the valve passage 49 and port 55. The pressure fluid is still admitted into the front part of the cylinder through the passage 50 and groove 51. However the rear actuating area of the piston 23 being greater than the front actuating area, the piston 23 will be forced forwardly while the pressure within the front end of the cylinder acts as a brake upon the piston by being pushed back into the pressure fluid conduit. It can readily be seen that any desired feeding speed may be obtained by manipulating the throttle valve 41 in such a manner as to provide a more or less complete registration of the valve passages 49 and 50 with their respective inlet passages 55 and 54. This feature, namely the introduction of pressure fluid on each side of the piston 23 has the great advantage to provide an efficient cushioning action for the feeding mechanism. When the rock drill is at work, the great vibratory impulse imparted to the machine is transmitted to the feeding mechanism. With pressure fluid on each side of the piston 23, the longitudinal vibrations imparted to the feed screw 28 from the front housing 13, will be checked, thus preventing the wear of the screw within its stationary nut 21.

When it is desired to bring the machine forwardly with great speed, as for instance when bringing the machine to the work, the throttle valve may then be positioned as illustrated in Fig. 8. Pressure fluid is now admitted only into the rear end of the feed cylinder through the valve passage 49 and port 55. The front end of the cylinder is vented to atmosphere through the passage 54, valve groove 52 and vent 62, thus allowing a rapid forward movement of the piston 23 and the consequential displacement of the rock drill.

When it is desired to retract the rock drill from the work, the throttle valve may be positioned as illustrated in Fig. 6. In that position pressure fluid is admitted into the front end of the feed cylinder through the valve passage 50 and port 54. Pressure acting upon the piston 23 will drive same rearwardly, the rear end of the cylinder 20 being opened to atmosphere through the port 55, valve groove 52 and vent 62.

During the forward or rearward displacement of the piston 23, the screw portion 28 will be forced through the stationary nut 21. Due to the rather long lead of its left hand thread, the screw will be rotated when pushed or pulled through the nut 21, thus causing a consequential displacement of the nut 30 upon the other portion of the screw. This portion being provided with a right hand thread, or a thread opposite to the thread engageable within the nut 21, will cause the displacement of the rock drill within the ways 16 in the same direction as the piston 23. However the two thread leads being of same length, it can readily be seen that the displacement of the rock drill will be twice as fast as the displacement of the piston 23. The rock drill is displaced by a longitudinal force resulting from the longitudinal movement of the piston 23 or screw 28, and by a second force resulting from the rotation of a helical rib or thread 29 with the nut 30.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In combination with a drilling motor, of feeding means therefor including a screw formed with a left hand and right hand threaded portion, a stationary nut operatively associated with one of said portions, means for effecting longitudinal displacement and rotary motion to said screw, a second nut connected to said motor and operatively associated with the other of said screw portions, said second nut being longitudinally movable upon said last mentioned screw portion by reason of the rotary motion of the latter whereby feeding motion is transmitted to said motor, the speed of said feeding motion being equal to the sum of the speed of said longitudinal displacement of said screw and the speed of the longitudinal displacement of said second nut upon said screw.

2. In combination with a drilling motor, of feeding mechanism therefor including a cylinder having a shaft longitudinally movable therein and capable of rotation, means associated with said shaft effecting said longitudinal motion including a fluid actuated piston reciprocably mounted in said cylinder, a stationary bushing operatively associated with said shaft, angular means within said bushing and upon said shaft for effecting the rotary motion of said shaft during its longitudinal displacement through said bushing, a packing within said bushing in fluid tight engagement with said shaft, a member associated with said shaft for longitudinal displacement therewith and angular means within said member and upon said shaft for transforming the rotary motion of said shaft to a longitudinal motion of said member upon said shaft, and means for transmitting said longitudinal motion of said member with and upon said shaft to said motor.

3. In combination with a drilling motor, of feeding mechanism therefor including a cylinder having a shaft longitudinally movable therein and capable of rotation, means associated with said shaft for effecting said longitudinal motion including a fluid actuated piston reciprocably mounted in said cylinder, a stationary bushing operatively associated with said shaft, angular means within said bushing and upon said shaft for effecting the rotary motion of said shaft during its longitudinal displacement through said bushing, a plurality of packings within said bushing in fluid tight engagement with said angular means upon said shaft, a member associated with said shaft for longitudinal displacement therewith and angular means within said member and upon said shaft for transforming the rotary motion of said shaft to a longitudinal motion of said member upon said shaft, and means for transmitting said longitudinal motion of said member with and upon said shaft to said motor.

4. In combination with a drilling motor, of feeding means therefor including a cylinder having a piston reciprocable therein, a stationary element within said cylinder, a member connected to said piston and capable of reciprocation through said stationary element, angular means on said member and within said stationary element responsive to the reciprocation of said member within said stationary element to cause the rotation of the former, and other angular means on said member for transforming the reciprocatory and rotary motion of the latter into a feeding motion and transmitting said feeding motion to said motor.

5. In combination with a feeding mechanism, of a member adapted to be fed thereby, said mechanism comprising a cylinder having a pistion reciprocable therein, a nut within said cylinder, a screw connected to said piston and reciprocated thereby through said nut, means for transforming the motion of said screw into a feeding motion and transmitting said feeding motion to said member, passages for admitting pressure fluid into said cylinder to actuate said piston, and packing means within said nut responsive to the action of the pressure fluid from said cylinder for engagement with the threads of said screw to afford a fluid tight joint between said nut and screw.

6. In combination with a feeding mechanism, of a member adapted to be fed thereby, said mechanism comprising a cylinder having a piston reciprocable therein, a nut within said cylinder, a screw connected to said piston and reciprocated thereby through said nut, means for transforming the motion of said screw into a feeding motion and transmitting said feeding motion to said member, passages for admitting pressure fluid into said cylinder to actuate said piston, and threaded packings within said nut capable of engagement with the thread of said screw for affording a fluid tight joint between said nut and screw.

7. In combination with a drilling motor, of feeding means therefor including a duality of solid screws rigidly coupled to each other in coaxial relation, means for effecting the longitudinal and rotary motions of said screws, and other means for transforming said motions of one of said screws into a feeding motion and transmitting said feeding motion to said motor.

8. In combination with a drilling motor, of feeding means therefor including a duality of movable screws of equal diameters, means associated with one of said screws for effecting the longitudinal and rotary motions of the latter, means for transmitting said motions to the other of said screws, and further means associated with the latter of said screws for transforming said motions into a feeding motion and transmitting said feeding motion to said motor.

9. In combination with a drilling motor, of feeding means therefor including a cylinder having a piston reciprocably mounted therein, an enlarged and a restricted area for said piston upon which pressure fluid may be admitted for actuating the latter, said enlarged area being equal to the internal cross sectional area of said cylinder, a screw connected to said piston for reciprocation with the latter, a stationary nut associated with said screw whereby rotary motion is imparted to the latter due to its reciprocatory motion relative to the former, and means associated with said screw and said motor whereby the reciprocatory and rotary motion of the former is transformed in a feeding motion transmitted to said motor at a different rate of speed than that of said piston.

10. In combination with a drilling motor, of feeding means therefor including a cylinder having a piston reciprocably mounted therein, an enlarged and a restricted area for said piston upon which pressure fluid may be admitted for actuating the latter, said enlarged area being equal to the internal cross sectional area of said cylinder, a shaft connected to said piston for reciprocation with the latter and capable of rotation on the axis of its reciprocation, a stationary member associated with means carried by said shaft for transforming the reciprocatory motion of the latter into a rotary motion, a member carried by said motor, means within said member engageable with similar means carried by said shaft whereby a feedng motion is transmitted to said member resulting from the reciprocatory and rotary motions of said shaft, said feeding motion being transmitted by said member to said motor at a different rate of speed than the reciprocatory motion of said piston.

11. In combination with a drilling motor, of feeding means therefor including a stationary cylinder, a fluid actuated feeding element reciprocable therein, a male member formed with a right and a left hand threaded portion of equal diameters capable of reciprocation with said feeding element, a stationary female element associated with one of said portions for effecting the rotary motion of said male member responsive to its reciprocatory motion, and a mechanism for combining said motions of said male member into a feeding motion and transmitting said feeding motion to said motor, said mechanism comprising a nut associated with said motor and with the other of said threaded portions.

12. In combination with a drilling motor, of feeding means therefor including a feed tube, a piston reciprocably mounted within said tube, an enlarged and a restricted area for said piston upon which pressure fluid may be admitted to actuate the latter, said enlarged area being equal to the inner cross sectional area of said feed tube, and speed multiplying connections between said piston and said motor including feed screw members cooperating with feed screw nuts.

13. In combination with a drilling motor, of feeding means therefor including a cylinder chamber, a piston reciprocably mounted within said chamber having opposed actuating areas upon which pressure fluid may be admitted for actuating said piston, one of said areas being equal to the cross sectional area of said chamber, and speed multiplying connections between said piston and said motor, including a feed screw member formed with right and left handed screw threaded portions cooperating with correspondingly threaded feed screw nuts.

14. In combination with a drilling motor, of feeding means therefor including a tube having a piston reciprocably mounted therein, said piston being formed with two faces of differential actuating areas, means for admitting pressure fluid to said faces for actuating said piston, connections between said piston and said motor for transmitting the movement of the former to the latter including a rotatable screw threaded member movable in and out of said tube, and packing means formed of fibrous material engageable with said member for preventing the escape of the pressure fluid from one of said piston faces having the smallest actuating area past the threads of said member.

15. In combination with a drilling motor, of feeding means therefor including a cylinder having a piston reciprocably mounted therein, means for admitting pressure fluid into said cylinder for actuating said piston, and connections between said piston and said motor including a plurality of screw threaded members, the threads of one of said members being adapted for constant operative interengagement with the threads of another of said members, a normal clearance between the interengaging threads of said members, and means within one of said members and protruding into said clearance for preventing the passage of the pressure fluid therethrough.

16. In combination with a drilling motor, of feeding means therefor including a feed tube having a fluid actuated feeding element reciprocable therein, a mechanism for transforming the reciprocation of said feeding element in a feeding motion and transmitting the same to said motor, said mechanism including a member formed with a left and a right hand screw threaded portion, one of said portions being movable into or out of said feed tube, the other of said portions extending from said feed tube a distance at least equal to the difference between the possible travel of said motor and the possible travel of said feeding element.

17. In combination with a drilling motor, of feeding means therefor including a feed tube having a fluid actuated feeding mechanism reciprocable therein, a connection between said feeding element and said motor comprising an elongated member reciprocable with said feeding element, means associated with said member and said motor for transforming the reciprocation of the former in a feeding motion and transmitting the same to said motor, said member being movable into and out of said feed tube and extending therefrom at least a distance equal to the difference between the possible travel of said motor and that of said feeding element.

JOHN C. CURTIS.